(12) United States Patent
Antani et al.

(10) Patent No.: US 8,949,423 B2
(45) Date of Patent: Feb. 3, 2015

(54) AUTONOMICALLY CO-LOCATING FIRST AND SECOND COMPONENTS ON A SELECT SERVER

(75) Inventors: Snehal S. Antani, Hyde Park, NY (US); Mohammad N. Fakhar, San Jose, CA (US); Hari Shankar, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1837 days.

(21) Appl. No.: 11/864,365

(22) Filed: Sep. 28, 2007

(65) Prior Publication Data

US 2009/0089429 A1 Apr. 2, 2009

(51) Int. Cl.
G06F 15/173 (2006.01)
H04L 29/08 (2006.01)
H04L 29/12 (2006.01)

(52) U.S. Cl.
CPC ............ *H04L 67/02* (2013.01); *H04L 61/1558* (2013.01); *H04L 29/12141* (2013.01)
USPC .......................................... 709/226; 709/200

(58) Field of Classification Search
USPC ................................. 709/200, 226
See application file for complete search history.

(56) References Cited

U.S. PATENT DOCUMENTS

| | | | | |
|---|---|---|---|---|
| 6,304,913 | B1 * | 10/2001 | Rune | 709/241 |
| 6,606,643 | B1 * | 8/2003 | Emens et al. | 709/203 |
| 6,701,453 | B2 * | 3/2004 | Chrabaszcz | 714/13 |
| 6,768,901 | B1 * | 7/2004 | Osborn et al. | 455/230 |
| 6,810,411 | B1 * | 10/2004 | Coughlin et al. | 709/203 |
| 6,912,569 | B1 * | 6/2005 | Sharma et al. | 709/223 |
| 6,959,307 | B2 | 10/2005 | Apte | |
| 6,959,333 | B2 * | 10/2005 | Beaumont et al. | 709/223 |
| 6,999,964 | B2 | 2/2006 | Graser et al. | |
| 7,043,563 | B2 * | 5/2006 | Vange et al. | 709/245 |
| 7,062,562 | B1 * | 6/2006 | Baker et al. | 709/227 |
| 7,065,541 | B2 * | 6/2006 | Gupta et al. | 707/204 |
| 7,165,186 | B1 * | 1/2007 | Viswanatham et al. | 714/1 |
| 7,181,731 | B2 | 2/2007 | Pace et al. | |
| 7,284,067 | B2 * | 10/2007 | Leigh | 709/238 |
| 7,296,290 | B2 * | 11/2007 | Barriga et al. | 726/8 |
| 7,526,551 | B1 * | 4/2009 | Islam et al. | 709/226 |
| 7,565,450 | B2 * | 7/2009 | Garcia-Luna-Aceves et al. | 709/245 |
| 7,634,556 | B2 * | 12/2009 | Huynh et al. | 709/223 |
| 8,244,792 | B2 * | 8/2012 | Boaz et al. | 709/200 |
| 2002/0165867 | A1 | 11/2002 | Graser et al. | |
| 2002/0169890 | A1 * | 11/2002 | Beaumont et al. | 709/245 |
| 2002/0184165 | A1 | 12/2002 | Deboer et al. | |
| 2003/0188036 | A1 * | 10/2003 | Chen et al. | 709/310 |

(Continued)

OTHER PUBLICATIONS

Steven Halter and Steven Munroe, Local/Remote Issues, Chapter 4, 2000, pp. 83-110, Sun, http://developer.java.sun.com/developer/Books/programming/performance/eperformance/eJavaCh04.pdf, Enterprise Java Performance.

(Continued)

*Primary Examiner* — Anthony Mejia
(74) *Attorney, Agent, or Firm* — Stevens & Showalter, LLP

(57) ABSTRACT

Systems, methods and computer program products are provided for identifying a first component on a first server and a second component on a second server for co-location, where the first and second servers are within a domain boundary; inspecting available server resources within the domain boundary; determining a select server in the domain boundary for co-location based upon the inspection of available server resources; and autonomically co-locating the first and second components to the select server.

8 Claims, 2 Drawing Sheets

(56) References Cited

U.S. PATENT DOCUMENTS

| | | | |
|---|---|---|---|
| 2004/0123287 A1* | 6/2004 | Fox et al. | 717/176 |
| 2004/0194066 A1* | 9/2004 | Frey et al. | 717/127 |
| 2004/0215725 A1 | 10/2004 | Love et al. | |
| 2004/0215768 A1* | 10/2004 | Oulu et al. | 709/224 |
| 2005/0010926 A1 | 1/2005 | Narayanaswamy et al. | |
| 2006/0156295 A1 | 7/2006 | Gissel et al. | |
| 2006/0161746 A1* | 7/2006 | Wong et al. | 711/162 |
| 2006/0161925 A1 | 7/2006 | Aikens et al. | |
| 2006/0195448 A1 | 8/2006 | Newport | |
| 2006/0209695 A1* | 9/2006 | Archer et al. | 370/235 |
| 2006/0224725 A1* | 10/2006 | Bali et al. | 709/224 |
| 2006/0265710 A1 | 11/2006 | Ansari | |
| 2007/0038995 A1 | 2/2007 | Boyle et al. | |
| 2007/0150430 A1* | 6/2007 | Campbell et al. | 706/60 |
| 2007/0233846 A1* | 10/2007 | Farber et al. | 709/223 |
| 2008/0215755 A1* | 9/2008 | Farber et al. | 709/245 |
| 2009/0089429 A1* | 4/2009 | Antani et al. | 709/226 |
| 2009/0157678 A1* | 6/2009 | Turk | 707/6 |
| 2010/0011408 A1* | 1/2010 | Bhattacharyya et al. | 726/1 |

OTHER PUBLICATIONS

U.S. Appl. No. 11/864,317, filed Sep. 28, 2007, entitled "Reducing Overhead in Component Interactions".

Mejia, Anthony; Office Action in U.S. Appl. No. 11/864,317; Dec. 23, 2009; U.S. Patent and Trademark Office; Alexandria, VA.

Mejia, Anthony; Office Action in U.S. Appl. No. 11/864,317; Jul. 20, 2010; U.S. Patent and Trademark Office; Alexandria, VA.

Mejia, Anthony; Office Action in U.S. Appl. No. 11/864,317; Dec. 14, 2010; U.S. Patent and Trademark Office; Alexandria, VA.

Mejia, Anthony; Notice of Allowance and Fee(s) Due; U.S. Appl. No. 11/864,317; Jul. 21, 2014; United States Patent and Trademark Office; Alexandria, Virginia.

* cited by examiner

AUTONOMICALLY CO-LOCATING FIRST AND SECOND COMPONENTS ON A SELECT SERVER

BACKGROUND OF THE INVENTION

The present invention relates to systems, computer-implemented methods and computer program products for autonomically co-locating first and second components to a select server.

Services oriented architecture promotes the interaction of logically related components among disparate systems. In simple implementations, this architecture proves to be very flexible. However, in some production environments, the interaction of these services can introduce significant overhead. As the usage patterns for applications evolve, a situation may develop where two components are tightly coupled but are not co-located within the same server. Hence, an increased amount of remote invocation overhead can be introduced resulting in a decrease in efficiency in the operation of the applications.

BRIEF SUMMARY OF THE INVENTION

According to various aspect of the present invention, systems, methods and computer program products are provided for identifying a first component on a first server and a second component on a second server for co-location, where the first and second servers are within a domain boundary; inspecting available server resources within the domain boundary; determining a select server in the domain boundary for co-location based upon the inspection of available server resources; and autonomically co-locating the first and second components to the select server.

DETAILED DESCRIPTION OF THE INVENTION

Figure 1:
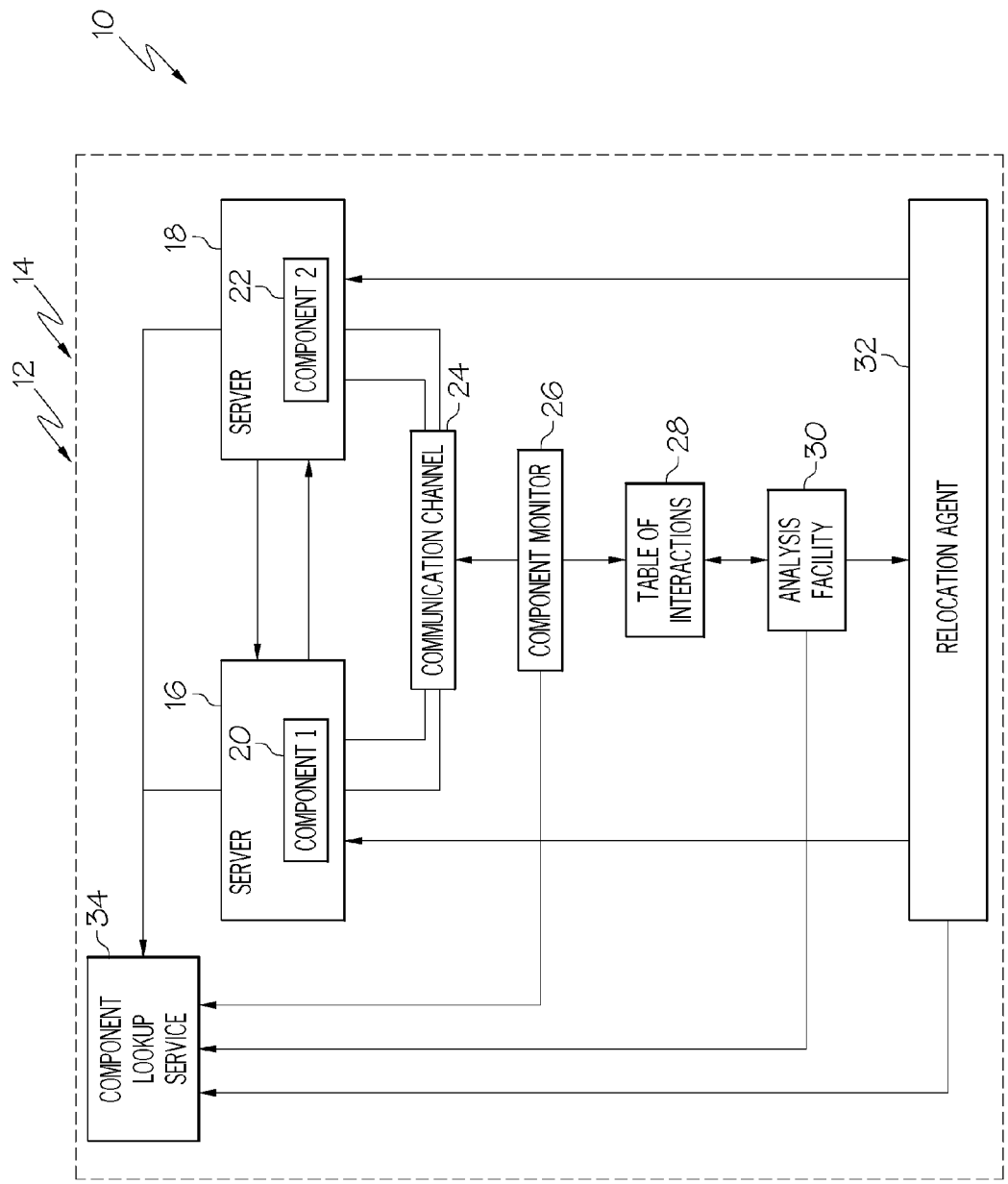
FIG. 1 illustrates in block diagram form a computing system suitable for implementing the present invention.

The present invention provides a method, system and computer program product to reduce overhead in component interactions. FIG. 1 illustrates a computing system 10 suitable for implementing the present invention. The computing system 10 comprises a WebSphere-based application server architecture developed by International Business Machines Corporation. In the illustrated embodiment, a single node 12 within a management domain boundary or cell 14 is provided. It is contemplated two or more nodes may be provided in the cell 14. The node 12 comprises a first J2EE application server 16 and a second J2EE application server 18. As is well known in the art, a J2EE application server hosts applications compliant with the Java 2 Platform, Enterprise Edition SDK, known as the J2EE™ specification. In the illustrated embodiment, the first and second J2EE application servers 16 and 18 comprise WebSphere servers, which servers are commercially available from International Business Machines Corporation. The node 12 may also comprise three or more J2EE application servers. The first and second J2EE application servers 16 and 18 may be provided on a single physical machine or on two or more separate physical machines.

In the illustrated embodiment, the first J2EE application server 16 is provided with a first component 20 comprising one or more Enterprise JavaBeans and the second J2EE application server 18 is provided with a second component 22 comprising one or more Enterprise JavaBeans. Enterprise JavaBeans are business components written in the Java programming language, hosted by a J2EE application server, and compliant with the J2EE specification. The first component 20 is installed on the first J2EE application server 16 within an enterprise archive (EAR) file (not shown). Likewise, the second component 22 is installed on the second J2EE application server 18 within an enterprise archive (EAR) file (not shown).

In accordance with the present invention, interactions between components residing on the first and second application servers 16 and 18 are monitored to determine whether a component on the first server 16 and a component on the second server 18 are coupled, i.e., tightly coupled, such that they should be co-located on the same J2EE application server. Interaction between two components means that at least one component is functionally dependent upon the other component. It is noted that component interactions are deterministic such that the functional dependence of two tightly coupled components can be detected, such as by inspecting communications that take place between the components, monitoring queries to a component lookup service such as a Java Naming and Directory Interface (JNDI) namespace or monitoring queries to a service registry such as the IBM WebSphere Registry and Repository.

J2EE architecture provides two interfaces from which an Enterprise JavaBean may be invoked. The first is a "local interface" and the second is a "remote interface." A local interface is used if a called Enterprise JavaBean is co-located on a same J2EE application server with a calling Enterprise JavaBean. Using a local interface means that method parameters between the called and calling Enterprise JavaBeans of first and second components will be passed by reference, as opposed to being passed by value, such that processing overhead is minimized. The remote interface is used if a called Enterprise JavaBean is located on a J2EE application server which is different from the J2EE application server on which the calling Enterprise JavaBean is located. Using a remote interface introduces excessive overhead in the following areas: serializing and deserializing parameters and network overhead for invoking the called Enterprise JavaBean via Java™ Remote Method Invocation over Internet Inter-ORB Protocol technology ("RMI-IIOP"), and thread management for blocking and notifying threads.

A component on a first server 16 and a component on a second server 18 are dislocated because they are located on separate servers. Further, the components are considered coupled, i.e., tightly coupled, such that they should be co-located on the same J2EE application server if the two components interact in such a way that co-location optimizes their interaction and/or reduces remote interface processing overhead. For example, a component on a first server 16 and a component on a second server 18 may be considered coupled, i.e., tightly coupled, such that the components should be co-located on the same J2EE application server if: each component is invoked and communicate with one another more than a predefined number of times in any given single transaction (5 invocations of each component/transaction); and/or, each component is invoked and communicate with one another at least once in a predefined number of transactions that occur within a predefined period of time (5 transactions/second). Other methods, techniques or definitions will be apparent to those skilled in the art for defining when a component on a first server 16 and a component on a second server 18 are tightly coupled, such that the components should be co-located on the same J2EE application server.

In the embodiment illustrated in FIG. 1, a communication channel 24 is provided between the first and second servers 16 and 18 so as to allow components on the first and second servers 16 and 18, such as the first and second components 20 and 22, to interact with one another. A component lookup service 34 is also provided, which may comprise a Java Naming and Directory Interface (JNDI) namespace or a service registry such as the IBM WebSphere Registry and Repository. A calling component will request from the component lookup service 34 the location of a component to be called prior to the calling component invoking the component to be called.

A component monitor 24 is provided to monitor the communication channel 24 and/or the component lookup service 34 so as to determine the interactions between the first and second components 20 and 22 and other pairs of interacting components on the first and second servers 16 and 18. For example, the component monitor 26 may monitor: the number of times each component 20 and 22, as well as each component in other component pairs, is invoked by and/or communicates with its corresponding other component during each transaction, and/or the number of transactions during a predefined period of time in which each of the components 20 and 22, as well as each component in other component pairs, is invoked by and/or communicates with its corresponding other component at least once. The component monitor 26 stores in a table of interactions 28 interaction data, such as: the number of times each component 20 and 22, as well as each component in other component pairs, is invoked by and/or communicates with its corresponding other component during each transaction, and/or the number of transactions during a predefined period of time in which each of the components 20 and 22, as well as each component in other component pairs, is invoked by and/or communicates with its corresponding other component at least once.

An analysis facility 30 is provided to analyze the data stored in the table of interactions 28 to derive usage patterns from the stored data and further to determine from the usage patterns whether the first and second components 20 and 22, as well as other pairs of components provided on the first and second servers 16 and 18, are coupled, i.e., tightly coupled, such that they should be co-located. As discussed above, a component on a first server 16 and a component on a second server 18 may be considered coupled, i.e., tightly coupled, such that the components should be co-located on the same J2EE application server if, each component is invoked by and/or communicates with its corresponding other component more than a predefined number of times in any given transaction (5 invocations of each component/transaction); and/or, each component is invoked by and/or communicates with its corresponding other component at least once in a predefined number of transactions that occur within a predefined period of time (5 transactions/second). If the analysis facility 30 determines, based on an analysis of the data stored in the table of interactions 28, that the first and second components 20 and 22, or pairs of other components provided on the first and second servers 16 and 18, are coupled, i.e., tightly coupled, such that they should be co-located, the analysis facility 30 then evaluates the available server resources within the cell 14.

In evaluating the available server resources, the analysis facility 30 determines if one or both of the first and second servers 16 and 18 has the processing capability and memory to receive, store and process the first and second components 20 and 22, and/or pairs of other tightly coupled components provided on the first and second servers 16 and 18, as well as needed external resources to host the first and second components 20 and 22, such as database definitions, security policies and the like. If both servers 16 and 18 have the resources to receive the first and second components 20 and 22 and/or pairs of other tightly coupled components provided on the first and second servers 16 and 18, the server 16, 18 having the most resources is selected to receive the additional component, e.g., the second component 22 if the selected server is the first server 16 and the first component 20 if the selected server is the second server 18. In a first embodiment, the analysis facility 30 then conveys a request to a relocation agent 32 to autonomically co-locate one of the first and second components 20 and 22 to the server having the other of the first and second components 20 and 22. For example, if the first server 16 is determined to have the most resources, the request conveyed to the relocation agent 32 is to relocate the second component 22 to the first server 16 and if the second server 18 is determined to have the most resources, the request conveyed to the relocation agent 32 is to relocate the first component 20 to the second server 18. If only one of the first and second servers 16 and 18 is determined to have sufficient resources to receive the first and second components 20 and 22 and/or pairs of other tightly coupled components provided on the first and second servers 16 and 18, then one of the first and second components 20 and 22 is co-located to that server, e.g., the second component 22 if the selected server is the first server 16 and the first component 20 if the selected server is the second server 18. If both the first and second servers 16 and 18 lack the resources to receive the first and second components 20 and 22, the analysis facility 30 will then determine if a third J2EE application server within the cell 14 has the resources to receive both the first and second components 20 and 22.

It is also contemplated that the analysis facility 30, instead of conveying a request to a relocation agent 32 to autonomically co-locate, may instead generate a request to a technician to manually co-locate one of the first and second components 20 and 22 to the server having the other of the first and second components 20 and 22 or relocate both components 20 and 22 to a third server via scripts and intervention.

If the relocation agent 32 receives a request from the analysis facility 30 to autonomically co-locate the first component 20 to the second server 18, the relocation agent 32 performs the following functions: the relocation agent 32 copies the first component 20 from the first server 16; the relocation agent 32 installs the first component 20 onto the second server 18; the relocation agent 32 starts the first component 20 on the second server 18; the relocation agent 32 updates a lookup directory (not shown) in the component lookup service 34 containing a listing of all components to indicate that the first component 20 has been installed on the second server 18; the relocation agent 32 quiesces work to the first component 20 on the first server 16; and the relocation agent 32 removes the first component 20 from the first server 16.

Figure 2:
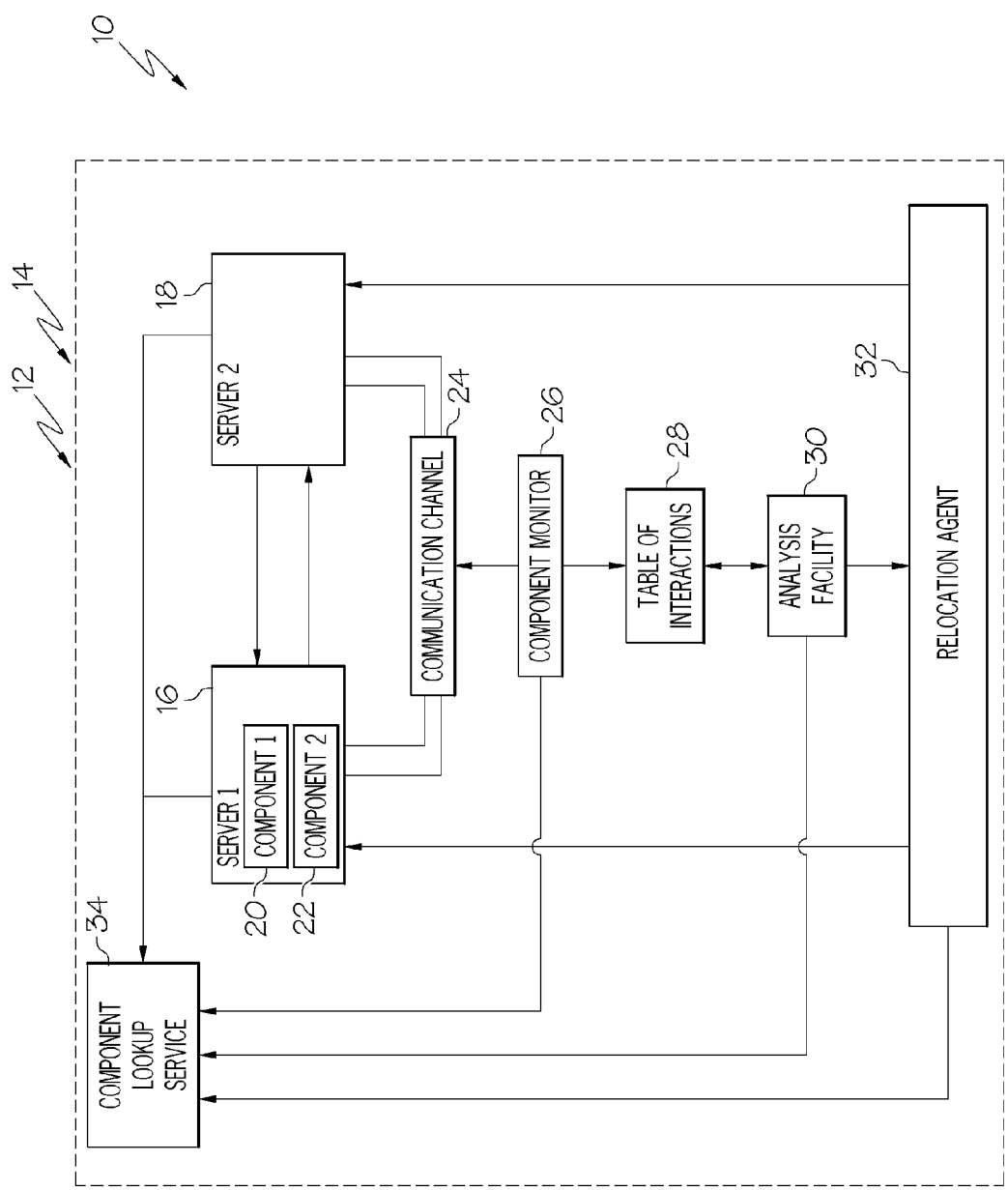
FIG. 2 is a diagram similar to FIG. 1 illustrating a second component after it has been moved to a first application server.

If the relocation agent 32 receives a request from the analysis facility 30 to autonomically co-locate the second component 22 to the first server 16, the relocation agent 32 performs the following functions: the relocation agent 32 copies the second component 22 from the second server 18; the relocation agent 32 installs the second component 22 onto the first server 16; the relocation agent 32 starts the second component 22 on the first server 16; the relocation agent 32 updates the lookup directory (not shown) in the component lookup service 34 containing a listing of all components to indicate that the second component 22 has been installed on the first server 16; the relocation agent 32 quiesces work to the second component 22 on the second server 18; and the relocation agent 32 removes the second component 22 from the second server 18, see FIG. 2.

If the relocation agent 32 receives a request from the analysis facility 30 to autonomically co-locate the first and second components 20 and 22 to a third server (not shown), the relocation agent 32 performs the following functions: the relocation agent 32 copies the first component 20 from the first server 16 and the second component 22 from the second server 18; the relocation agent 32 installs the first and second components 20 and 22 onto the third server; the relocation agent 32 starts the first and second components 20 and 22 on the third server; the relocation agent 32 updates the lookup directory (not shown) in the component lookup service 34 containing a listing of all components to indicate that the first and second components 20 and 22 have been installed on the third server; the relocation agent 32 quiesces work to the first and second components 20 and 22 on the first and second servers 16 and 18; and the relocation agent 32 removes the first and second components 20 and 22 from the first and second servers 16 and 18.

The various aspects of the present invention may be embodied as systems, computer-implemented methods and computer program products. Also, various aspects of the present invention may take the form of an entirely hardware embodiment, an entirely software embodiment (including software, firmware, micro-code, etc.) or an embodiment combining software and hardware, wherein the embodiment or aspects thereof may be generally referred to as a "circuit," "component" or "system." Furthermore, the various aspects of the present invention may take the form of a computer program product on a computer-usable storage medium having computer-usable program code embodied in the medium or a computer program product accessible from a computer-usable or computer-readable medium providing program code for use by or in connection with a computer or any instruction execution system.

The software aspects of the present invention may be stored, implemented and/or distributed on any suitable computer usable or computer readable medium(s). For the purposes of this description, a computer-usable or computer readable medium can be any apparatus that can contain, store, communicate, propagate, or transport the program for use by or in connection with the instruction execution system, apparatus, or device. The computer program product aspects of the present invention may have computer usable or computer readable program code portions thereof, which are stored together or distributed, either spatially or temporally across one or more devices. A computer-usable or computer-readable medium may comprise, for example, an electronic, magnetic, optical, electromagnetic, infrared, or semiconductor system, apparatus, device, or propagation medium. As yet further examples, a computer usable or computer readable medium may comprise cache or other memory in a network processing device or group of networked processing devices such that one or more processing devices stores at least a portion of the computer program product. The computer-usable or computer-readable medium may also comprise a computer network itself as the computer program product moves from buffer to buffer propagating through the network. As such, any physical memory associated with part of a network or network component can constitute a computer readable medium.

More specific examples of the computer usable or computer readable medium comprise for example, a semiconductor or solid state memory, magnetic tape, an electrical connection having one or more wires, a swappable intermediate storage medium such as floppy drive or other removable computer diskette, tape drive, external hard drive, a portable computer diskette, a hard disk, a rigid magnetic disk, a random access memory (RAM), a read-only memory (ROM), an erasable programmable read-only memory (EPROM or Flash memory), a portable compact disc read-only memory (CD-ROM), a read/write (CD-R/W) or digital video disk (DVD), an optical fiber, disk or storage device, or a transmission media such as those supporting the Internet or an intranet. The computer-usable or computer-readable medium may also comprise paper or another suitable medium upon which the program is printed or otherwise encoded, as the program can be captured, for example, via optical scanning of the program on the paper or other medium, then compiled, interpreted, or otherwise processed in a suitable manner, if necessary, and then stored in a computer memory. The computer-usable medium may include a propagated data signal with the computer-usable program code embodied therewith, either in baseband or as part of a carrier wave or a carrier signal. The computer usable program code may also be transmitted using any appropriate medium, including but not limited to the Internet, wire line, wireless, optical fiber cable, RF, etc.

A data processing system suitable for storing and/or executing program code may include at least one processor coupled directly or indirectly to memory elements, e.g., through a system bus or other suitable connection. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in any suitable language, including for example, an object oriented programming language such as Java, Smalltalk, C++ or the like. The computer program code for carrying out operations of the present invention may also be written in conventional procedural programming languages, such as the "C" programming language, or in higher or lower level programming languages. The program code may execute entirely on a single processing device, partly on one or more different processing devices, as a stand-alone software package or as part of a larger system, partly on a local processing device and partly on a remote processing device or entirely on the remote processing device. In the latter scenario, the remote processing device may be connected to the local processing device through a network such as a local area network (LAN) or a wide area network (WAN), or the connection may be made to an external processing device, for example, through the Internet using an Internet Service Provider.

The processing devices may comprise for example, servers, personal computers, notebook computers, transactional systems, appliance or pervasive computing devices such as personal data assistants (PDA), palm computers, cellular access processing devices, special purpose computing devices and/or other devices capable of interacting with the system, and may thus be implemented in hardware, software, or a combination of hardware and software.

The various processing devices may be supported by networking components such as routers, hubs, firewalls, network interfaces, wired or wireless communications links and corresponding interconnections. Moreover, the network system may comprise one or more intranets, extranets, local area networks (LAN), wide area networks (WAN), wireless networks (WIFI), the Internet, including the World Wide Web, and/or other arrangements for enabling communication between the processing devices 102, either real time or otherwise, e.g., via time shifting, batch processing, etc.

Those of ordinary skill in the art will appreciate that the hardware may vary, depending on the implementation. For example, the above described components may be integrated or implemented as separate components. The depicted example is not meant to imply architectural limitations with respect to the present invention. Moreover, the above configuration is shown by way of illustration and not by way of limitation. As such, other processing system configurations may be implemented.

The present invention is described with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams may be implemented by system components or computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention may be practiced on any form of computer system, including a stand alone computer or one or more processors participating on a distributed network of computers. Thus, computer systems programmed with instructions embodying the methods and/or systems disclosed herein, or computer systems programmed to perform various aspects of the present invention and storage or storing media that store computer readable instructions for converting a general purpose computer into a system based upon the various aspects of the present invention disclosed herein, are also considered to be within the scope of the present invention. Once a computer is programmed to implement the various aspects of the present invention, including the methods of use as set out herein, such computer in effect, becomes a special purpose computer particular to the methods and program structures of this invention. The techniques necessary for this are well known to those skilled in the art of computer systems.

The flowchart and block diagrams in the Figures illustrate the architecture, functionality, and operation of possible implementations of systems, methods and computer program products according to various embodiments of the present invention. In this regard, one or more blocks in the flowchart or block diagrams may represent a component, segment, or portion of code, which comprises one or more executable instructions for implementing the specified logical function (s). In some alternative implementations, the functions noted in the blocks may occur out of the order noted in the figures. For example, two blocks shown in succession may, in fact, be executed substantially concurrently or in the reverse order.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A method of autonomically co-locating programming language written components in a computing environment comprising:
    identifying a first programming language written component on a first server and a second programming language written component on a second server for co-location, where said first and second servers are within a domain boundary;
    inspecting available server resources within said domain boundary;
    determining a select server in said domain boundary for co-location based upon the inspection of available server resources; and
    autonomically co-locating said first and second programming language written components to said select server.

2. The method of autonomically co-locating programming language written components in a computing environment as set out in claim 1, wherein if said first server comprises said select server, said autonomically co-locating said first and second programming language written components to said select server comprises:
    copying said second programming language written component;
    installing said second programming language written component on said first server;
    starting said second programming language written component on said first server;

updating a lookup directory containing a listing of all components to indicate that said second programming language written component has been installed on said first server;

quiescing work to said second programming language written component on said second server; and removing said second programming language written component from said second server upon completion of said work by said second programming language written component.

3. The method of autonomically co-locating programming language written components in a computing environment as set out in claim 1, wherein if said second server comprises said select server, said autonomically co-locating said first and second programming language written components to said select server comprises:

copying said first programming language written component;

installing said first programming language written component on said second server;

starting said first programming language written component on said second server;

updating a lookup directory containing a listing of all components to indicate that said first programming language written component has been installed on said second server;

quiescing work to said first programming language written component on said first server; and removing said first programming language written component from said first server upon completion of said work by said first programming language written component.

4. The method of autonomically co-locating programming language written components in a computing environment as set out in claim 1, wherein if a third server in said domain boundary comprises said select server, said autonomically co-locating said first and second programming language written components to said select server comprises:

copying said first and second programming language written components;

installing said first and second programming language written components on said third server;

starting said first and second programming language written components on said third server;

updating a lookup directory containing a listing of all components to indicate that said first and second programming language written components have been installed on said third server;

quiescing work to said first programming language written component on said first server and said second programming language written component on said second server; and removing said first programming language written component from said first server and said second programming language written component from said second server.

5. A computer program product to autonomically co-locate programming language written components in a computing environment comprising:

a non-transitory computer readable storage medium having computer usable program code embodied therewith, the computer usable program code comprising:

computer usable program code configured to identify a first programming language written component on a first server and a second programming language written component on a second server for co-location, where said first and second servers are within a domain boundary;

computer usable program code configured to inspect available server resources within said domain boundary;

computer usable program code configured to determine a select server in said domain boundary for co-location based upon the inspection of available server resources; and computer usable program code configured to autonomically co-locate said first and second programming language written components to said select server.

6. The computer program product as set out in claim 5, wherein if said first server comprises said select server, said computer usable program code to autonomically co-locate said first and second programming language written components to said select server comprises:

computer program product to copy said second programming language written component;

computer program product to install said second programming language written component on said first server;

computer program product to start said second programming language written component on said first server;

computer program product to update a lookup directory containing a listing of all components to indicate that said second programming language written component has been installed on said first server;

computer program product to quiesce work to said second programming language written component on said second server; and computer program product to remove said second programming language written component from said second server upon completion of said work by said second programming language written component.

7. The computer program product as set out in claim 5, wherein if said second server comprises said select server, said computer program product to autonomically co-locate said first and second programming language written components to said select server comprises:

computer program product to copy said first programming language written component;

computer program product to install said first programming language written component on said second server;

computer program product to start said first programming language written component on said second server;

computer program product to update a lookup directory containing a listing of all components to indicate that said first programming language written component has been installed on said second server;

computer program product to quiesce work to said first programming language written component on said first server; and computer program product to remove said first programming language written component from said first server upon completion of said work by said first programming language written component.

8. The computer program product as set out in claim 5, wherein if a third server comprises said select server, said computer program product to autonomically co-locate said first and second programming language written components to said select server comprises:

computer program product to copy said first and second programming language written components;

computer program product to install said first and second programming language written components on said third server;

computer program product to start said first and second programming language written components on said third server;

computer program product to update a lookup directory containing a listing of all components to indicate that said first and second programming language written components have been installed on said third server;

computer program product to quiesce work to said first programming language written component on said first server and said second programming language written component on said second server; and computer program product to remove said first programming language written component from said first server and said second programming language written component from said second server.

* * * * *